United States Patent [19]

Mukai et al.

[11] Patent Number: 5,353,909
[45] Date of Patent: Oct. 11, 1994

[54] FEEDING AND INDEXING APPARATUS

[75] Inventors: Takahiro Mukai; Toshikazu Nakayama; Shoji Yamagishi, all of Yokohama, Japan

[73] Assignee: Kirin Techno-System Corporation, Yokohama, Japan

[21] Appl. No.: 111,902

[22] Filed: Aug. 26, 1993

[30] Foreign Application Priority Data

Aug. 29, 1992 [JP] Japan .................................. 4-254138
Jul. 22, 1993 [JP] Japan .................................. 5-201826

[51] Int. Cl.$^5$ .............................................. B65G 17/00
[52] U.S. Cl. ................................. 198/343.2; 198/476.1
[58] Field of Search ............... 198/343.1, 343.2, 474.1, 198/476.1, 802

[56] References Cited

U.S. PATENT DOCUMENTS 5,074,397 12/1991 Mukai et al. .

FOREIGN PATENT DOCUMENTS 0411851 2/1991 European Pat. Off. .
3042377 6/1982 Fed. Rep. of Germany .

*Primary Examiner*—Joseph E. Valenza
*Attorney, Agent, or Firm*—Oblon, Spivak, McClelland, Maier & Neustadt

[57] ABSTRACT

An feeding and indexing apparatus has article feed units which can start and stop along a circular path at specific time intervals when drive arms are rotated at a constant speed. A cam assembly is disposed radially inwardly of and concentrically with the circular path, and cam followers are movable in contact with the cam assembly. The drive arms are rotatable about the center of the cam assembly. Driven arms are operatively coupled to the drive arms, respectively, at respective junction points and to the cam followers, respectively. The cam assembly has a wavy cam profile including a plurality of mountains and a plurality of valleys alternating with the mountains. A pitch angle between adjacent ones of the mountains or valleys of the cam assembly is different from a pitch angle between adjacent ones of the junction points of the drive arms and the driven arms, so that the article feed units operate at slightly different times.

7 Claims, 7 Drawing Sheets

FEEDING AND INDEXING APPARATUS

BACKGROUND OF THE INVENTION

1. Field of the Invention

The present invention relates to a feeding and indexing apparatus for intermittently feeding articles along a circular path, and more particularly to a feeding and indexing apparatus capable of preventing the fluctuations in the load that the apparatus experiences while it is intermittently feeding articles.

2. Description of the Prior Art

One known feeding and indexing apparatus disclosed in a Japanese laid-open patent publication No. 3-192016 moves successively supplied articles along a circular path, and stops the articles at a certain angular position for inspecting or otherwise processing them.

The disclosed feeding and indexing apparatus will be described in detail below with reference to FIG. 7 of the accompanying drawings. The feeding and indexing apparatus has a plurality of spaced article feed units 2 movable along a circular path 1 and a substantially circular cam groove 3 positioned radially inwardly of and concentrically with the circular path 1. The cam groove 3 includes an arcuate portion on half of its full extent and also has an inner cam profile 3a and an outer cam profile 3b which are radially spaced from each other and have a way configuration. The inner and outer cam profiles 3a, 3b jointly have a plurality of valleys $R_1$–$R_7$ and a plurality of mountains $R'_1$–$R'_6$ alternating with the valleys $R_1$–$R_7$. The feeding and indexing apparatus also has a plurality of cam followers 4 in the form of rollers provided in unison with the respective article feed units 2. The cam followers 4 are movable in contact with the inner and outer cam profiles 3a, 3b.

A plurality of radial drive arms 5 rotatable about the center O of the cam groove 3 are associated respectively with the article feed units 2. More specifically, the drive arms 5 have respective radial outer ends to which respective inverted L-shaped driven arms 7 are angularly movably connected at their axes by respective rotary bearings 6. The driven arms 7 have respective hands connected to the respective cam followers 4. The driven arms 7 have respective radial hands that are operatively connected to the respective article feed units 2 by respective linear sliding bearings 8 serving as connecting members such that the distance between the rotating axes of the driven arms 7, i.e., the position of the rotary bearings 6 and the respective article feed units 2, is variable. Rotary bearings 9 are interposed between the linear sliding bearings 8 and the article feed units 2 for making the article feed units 2 rotatable with respect to the linear sliding bearings 8.

The conventional feeding and indexing apparatus shown in FIG. 7 operates as follows: The feeding and indexing apparatus receives, at a contact point $T_1$, an article on one of the article feed units 2 from an inlet star wheel $W_1$ that is rotating continuously. The drive arms 5 are rotating at a constant speed in the direction indicated by the arrow A. While a cam follower 4 is moving in the arcuate portion of the cam groove 3, the article feed unit 2 associated with the cam follower 4 moves along the circular path 1 at a constant speed. As the cam follower 4 approaches the valley $R_1$ in the wavy configuration of the cam groove 3, the driven arm 7 is angularly moved counterclockwise about the rotary bearing 6 with respect to the drive arm 5. Therefore, the driven arm 7 is tilted further forwardly along the circular path 1 from a radially outward extension of the drive arm 5. The article feed unit 2 approaches a stop position $S_1$ and hence is decelerated. The article feed unit 2 is stopped when it reaches the stop position $S_1$.

When the drive arm 5 and the radial hand of the driven arm 7 are radially aligned with each other, they are in a central position during an interval in which the article feed unit 2 is in the stop position $S_1$. The article feed unit 2 remains in the stop position $S_1$ so long as the drive arm 5 is positioned within an angular range $\alpha$ across the central position.

While the driven arm 7 is angularly moving about the stop position $S_1$, the article feed unit 2 continues to remain at rest in the stop position $S_1$. During angular movement of the driven arm 7 about the stop position $S_1$, the distance between the article feed unit 2 and the rotating axis of the driven arm 7 (the position of the rotary bearing 6) varies, and the variation in the distance is compensated by the linear sliding bearing 8 that connects the article feed unit 2 to the driven arm 7. The cam follower 4 approaches the peak of the mountain $R'_1$ upon further rotation of the drive arm 5, and the article feed unit 2 starts leaving the stop position $S_1$. Continued movement of the cam follower 4 past the mountain $R'_1$ toward the valley $R_2$ causes the article feed unit 2 to approach the radially outward extension of the drive arm 5, i.e., to be accelerated. When the drive arm 5 is superposed on the mountain $R'_1$, the speed of the article feed unit 2 is maximum.

Thereafter, the article feed unit 2 moves toward a next stop position $S_2$, and repeats the above operation. After the article feed unit 2 moves past a last stop position $S_7$, the article feed unit 2 is accelerated. Then, the article feed unit 2 moves at a constant speed, and discharges the article onto an outlet star wheel $W_2$ at a contact point $T_2$.

In the conventional feeding and indexing apparatus, a pitch angle $\theta_1$ formed at the center O between adjacent mountains or valleys of the cam groove 3 is equal to a pitch angle $\theta_2$ formed at the center O between adjacent junction points of the drive arms 5 and the driven arms 7 (adjacent rotary bearings 6). Therefore, all the article feed units 2 start from and stop at synchronously at the stop positions $S_1$–$S_7$. As a result, the load imposed on the feeding and indexing apparatus varies greatly between start and stop times, and hence tends to vibrate during operation thereof. Such vibration is detrimental to any processing operation effected on articles carried by the article feed units 2, and deters the feeding and indexing apparatus from being operated at high speed. Furthermore, the durability of the feeding and indexing apparatus is impaired when it is subject to vibrations. If the articles carried by the article feed units 2 are inspected at the respective stop positions $S_1$–$S_7$, then the inspecting procedure is adversely affected by the vibration of the feeding and indexing apparatus. Consequently, there has been a need to prevent the feeding and indexing apparatus from vibrating.

SUMMARY OF THE INVENTION

It is therefore an object of the present invention to provide a feeding and indexing apparatus having a plurality of article feed units which start and stop moving at different times thereby levelling the load imposed on the feeding and indexing apparatus, thus preventing the feeding and indexing apparatus from vibrating and allowing the feeding and indexing apparatus to increase its durability.

According to the present invention, there is provided a feeding and indexing apparatus comprising a plurality of spaced article feed units movable along a circular path for carrying articles; cam means disposed radially inwardly of and concentrically with the circular path, the cam means having a wavy cam profile including a plurality of mountains and a plurality of valleys alternating with the mountains; a plurality of cam followers movable in contact with the cam means; drive arm means rotatable about a center of the cam means for moving the article feed units; a plurality of driven arms operatively coupled to the drive arm means, at respective junction points and to the cam followers; and a plurality of connecting members operatively coupled to the driven arms, and to the article feed units, each of the connecting members being provided for allowing the distance between a rotating axis of the driven arm and the article feed unit to vary; wherein the article feed units can intermittently move along the circular path when the drive arm means is rotated at a constant speed; and wherein a pitch angle between adjacent ones of the mountains or valleys are different from a pitch angle between adjacent ones of the junction points of the driving arm means and the driven arms.

With the above structure, the pitch angle between adjacent mountains or valleys of the cam means differ from the pitch angle between adjacent junction points at which the drive arm means and the driven arms are operatively coupled to each other. Therefore, the article feed units operate at slightly different times. Since some article feed units may be stopped, accelerated, and decelerated, respectively, at a certain time, the load on the feeding and indexing apparatus is evened over a period of time. Consequently, the feeding and indexing apparatus is not subjected to unwanted vibrations which would otherwise be caused by varying loads. The feeding and indexing apparatus allows the articles carried by the article feed units to be processed smoothly, can be operated at high speed, and is highly durable.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
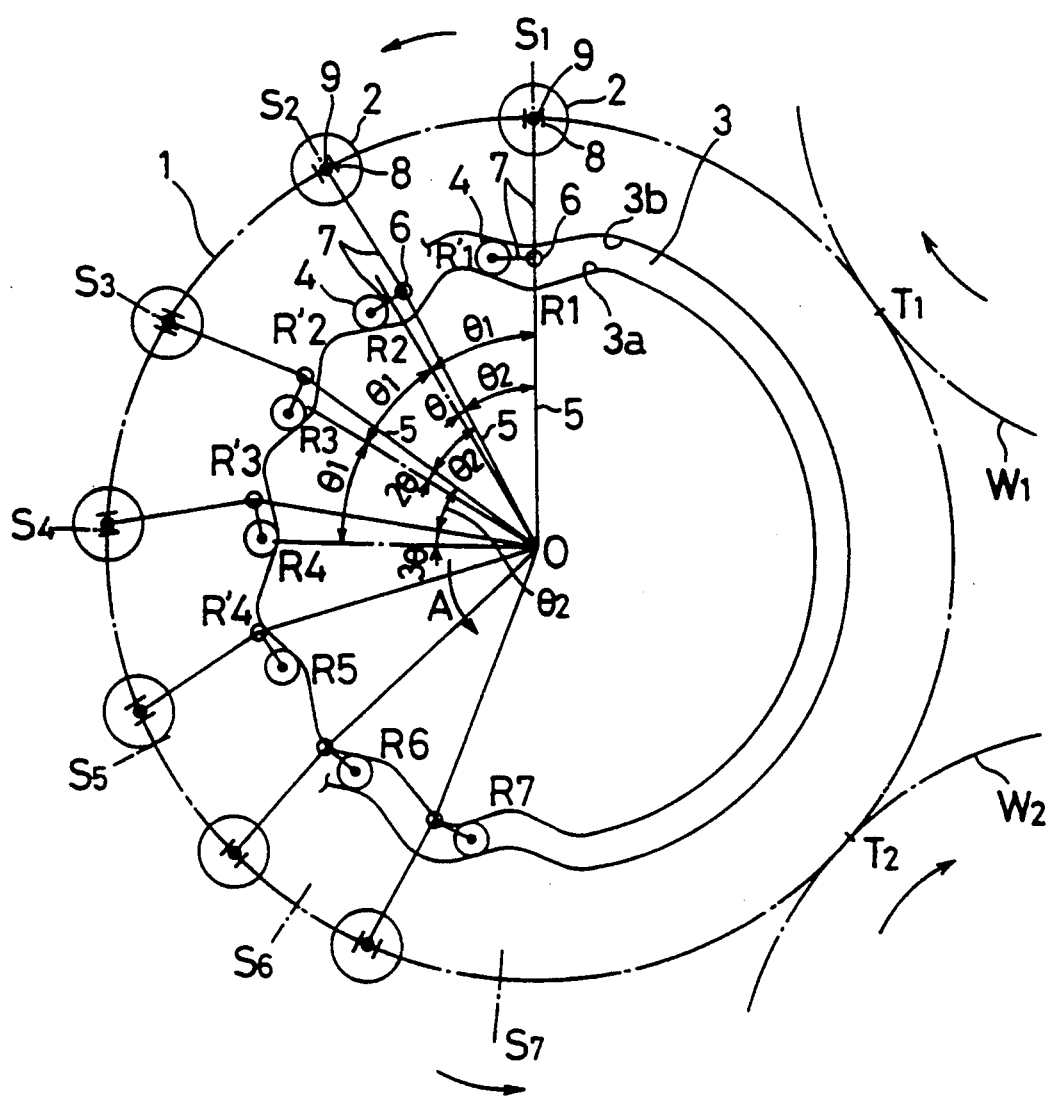
FIG. 1 is a schematic plan view of a feeding and indexing apparatus according to the present invention.
Figure 7:
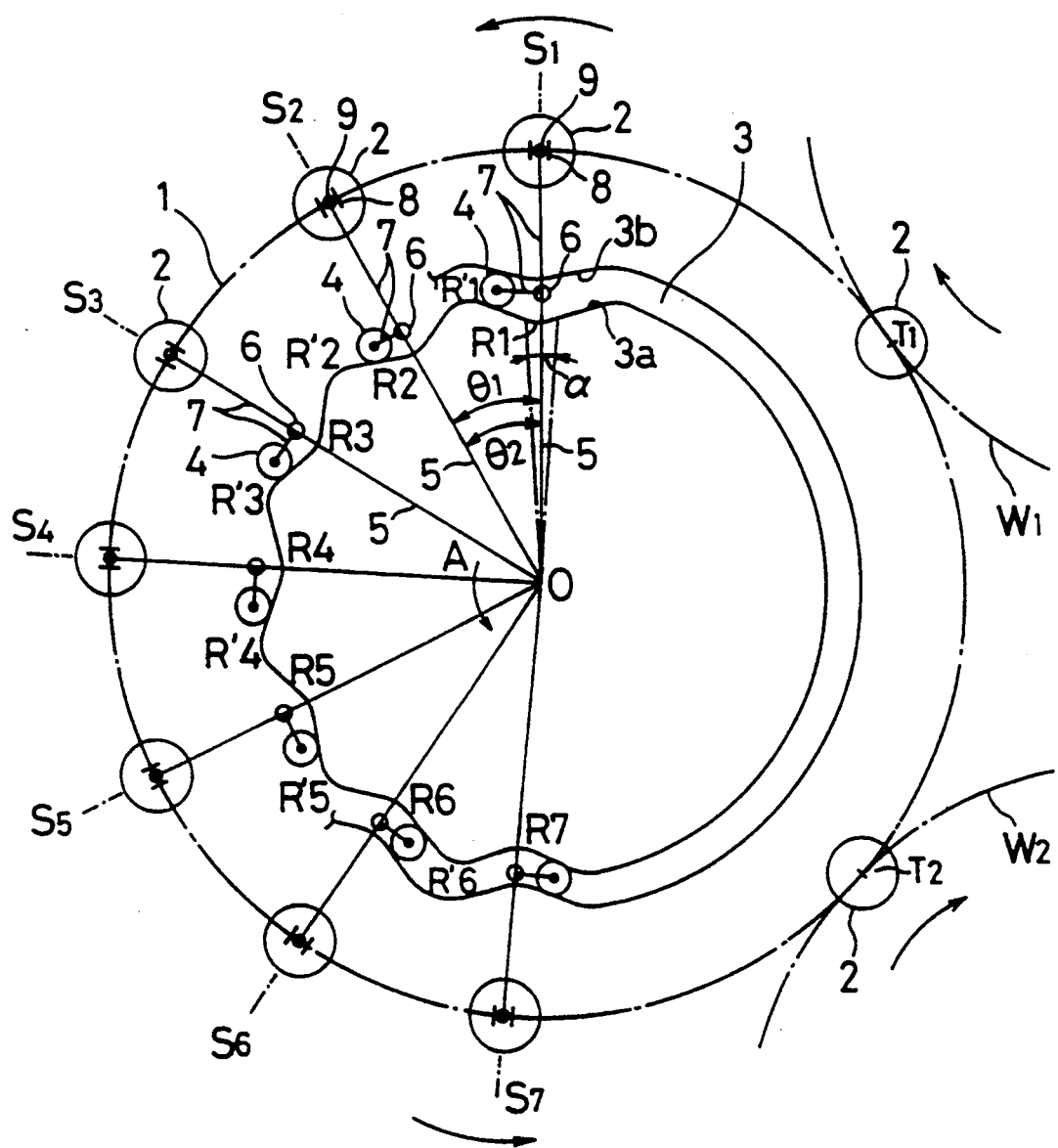
FIG. 7 is a schematic plan view of a conventional feeding and indexing apparatus.

As shown in FIG. 1, a feeding and indexing apparatus according to the present invention is similar to the conventional feeding and indexing apparatus shown in FIG. 7. Specifically, the feeding and indexing apparatus comprises: a plurality of spaced article feed units 2 movable along a circular path 1; and a substantially circular cam groove 3 positioned radially inwardly of and concentrically with the circular path 1. The cam groove 3 includes an arcuate portion on half of its full extent and also has an inner cam profile 3a and an outer cam profile 3b which are radially spaced from each other and have a wavy configuration. The inner and outer cam profiles 3a, 3b jointly have a plurality of valleys R1–R7 and a plurality of mountains R'1–R'6 alternating with the valleys R1–R7. The feeding and indexing apparatus also has a plurality of cam followers 4 in the form of rollers provided in unison with the respective article feed units 2. The cam followers 4 are movable in contact with the inner and outer cam profiles 3a, 3b.

The feeding and indexing apparatus also includes a plurality of radial drive arms 5 rotatable about the center O of the cam groove 3. The drive arms 5 have respective radial outer ends to which respective inverted L-shaped driven arms 7 are angularly movably connected at their axes by respective rotary bearings 6 at junction points. The driven arms 7 have respective hands connected to the respective cam followers 4. The driven arms 7 have respective radial hands that are connected to the respective article feed units 2 by respective linear sliding bearings 8 serving as connecting members such that the distance between the axes of the driven arms 7, i.e., the position of the rotary bearings 6 and the respective article feed units 2, is variable. Rotary bearings 9 are interposed between the linear sliding bearings 8 and the article feed units 2 for making the article feed units 2 rotatable with respect to the linear sliding bearings 8.

In the feeding and indexing apparatus shown in FIG. 1, a pitch angle $\theta_1$ is formed at the center O between the center of the valley R1 corresponding to the stop position $S_1$ and the center of the valley R2 corresponding to the stop position $S_2$, and a pitch angle $\theta_2$ is formed at the center O between the junction point of the drive arm 5 and the driven arm 7 (the rotary bearing 6) corresponding to the stop position $S_1$ and the junction point of the drive arm 5 and the driven arm 7 (the rotary bearing 6) corresponding to the stop position $S_2$. These pitch angles $\theta_1$, $\theta_2$ differ from each other by an angle $\theta$, and are not equal to each other ($\theta_1 \neq \theta_2$). The pitch angle $\theta_1$ may be made greater or smaller than the pitch angle $\theta_2$.

The instant a drive arm 5 is aligned with the center of the valley R1 at the stop position $S_1$, another drive arm 5 is angularly spaced from the center of the valley R2 by an angle $\theta$ at the stop position $S_2$, and still another drive arm 5 is angularly spaced from the center of the valley R3 by an angle $2\theta$ at the stop position $S_3$. Generally, a drive arm 5 is angularly spaced from the center of a valley Rn by an angle $(n-1)\theta$ at a stop position $S_n$ (n is an integer of 1 or greater). Therefore, the article feed units 2 operate at slightly different times.

If the angle $\theta$ corresponds to a rotating angle per a unit time, then a drive arm 5 is aligned with the center of the valley R2 at the stop position $S_2$ upon elapse of the unit time from the instant the parts are positioned as shown in FIG. 1. Upon elapse of another unit time, a drive arm 5 is aligned with the center of the valley R3 at the stop position S3. Consequently, the article feed units 2 start and stop moving successively at different times depending on the magnitude of the unit time.

Figure 2:
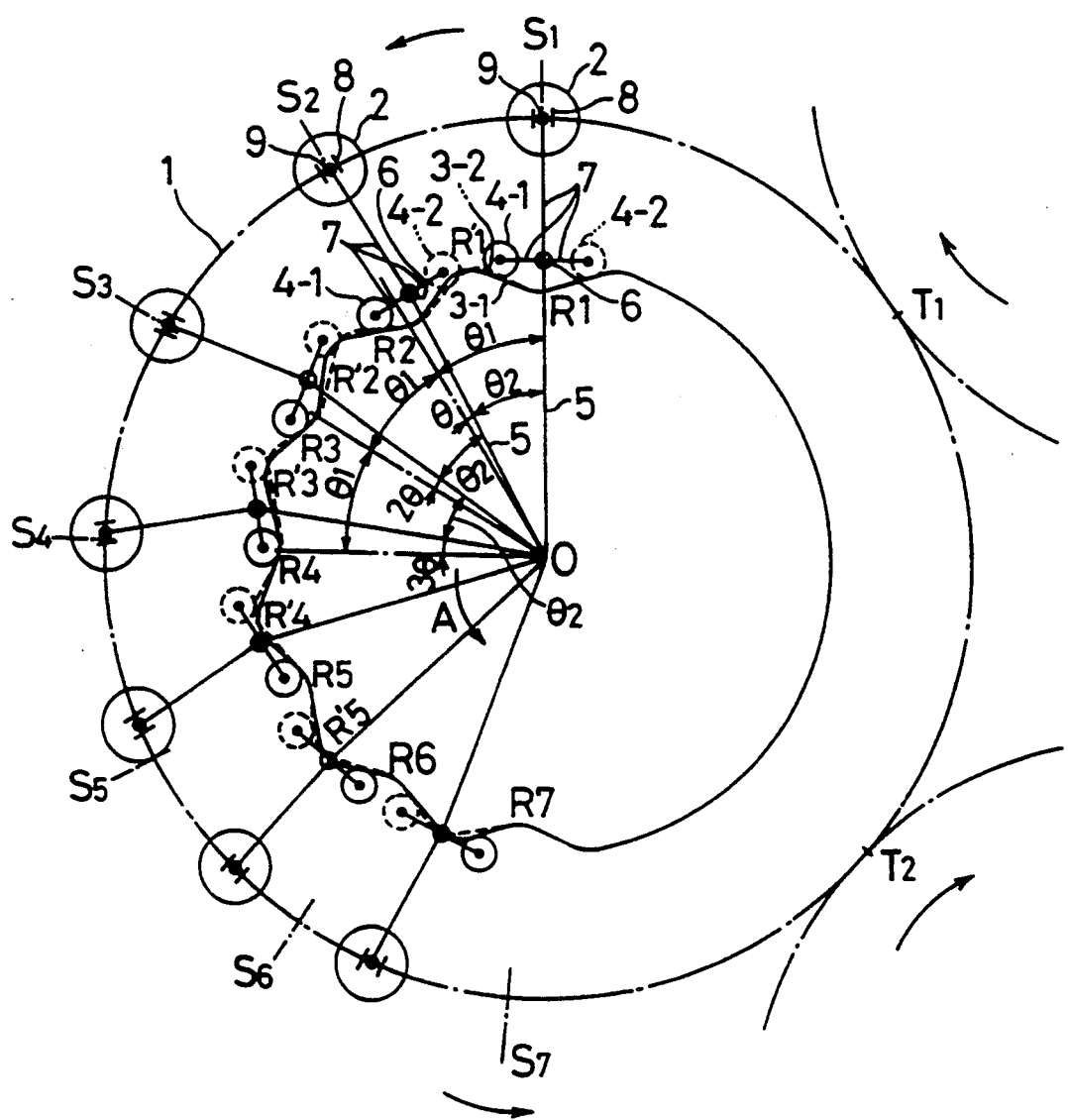
FIG. 2 is a schematic plan view of a modified feeding and indexing apparatus according to the present invention.

FIG. 2 shows a modification of the feeding and indexing apparatus shown in FIG. 1. The modification is with respect to the cam, the cam follower, and the driven arms. The other details of the modified feeding and indexing apparatus shown in FIG. 2 are the same as those of the feeding and indexing apparatus shown in FIG. 1. As shown in FIG. 2, the modified feeding and indexing apparatus has two cams 3-1, 3-2 positioned one on the other, with the cam 3-2 being indicated by broken lines. The cams 3-1, 3-2 are conjugate cams with respect to each other.

The modified feeding and indexing apparatus also has a plurality of pairs of cam followers 4-1, 4-2 held in contact with the respective cams 3-1, 3-2, with the cam followers 4-2 being indicated by broken lines. The drive arms 5, the article feed units 2, and the cam followers 4-1, 4-2 are operatively coupled to each other by T-shaped driven arms 7. The driven arms 7 are operatively connected to the respective article feed units 2 by respective linear sliding bearings 8 serving as connecting members. The modified feeding and indexing apparatus shown in FIG. 2 operates in the same manner as the feeding and indexing apparatus shown in FIG. 1.

Each of the feeding and indexing apparatus shown in FIGS. 1 and 2 has a plurality of drive arms 5. These drive arms 5 may be replaced with a unitary drive plate, and the unitary drive plate may support rotary bearings 6 by which driven arms 7 are rotatably supported.

Figure 3:
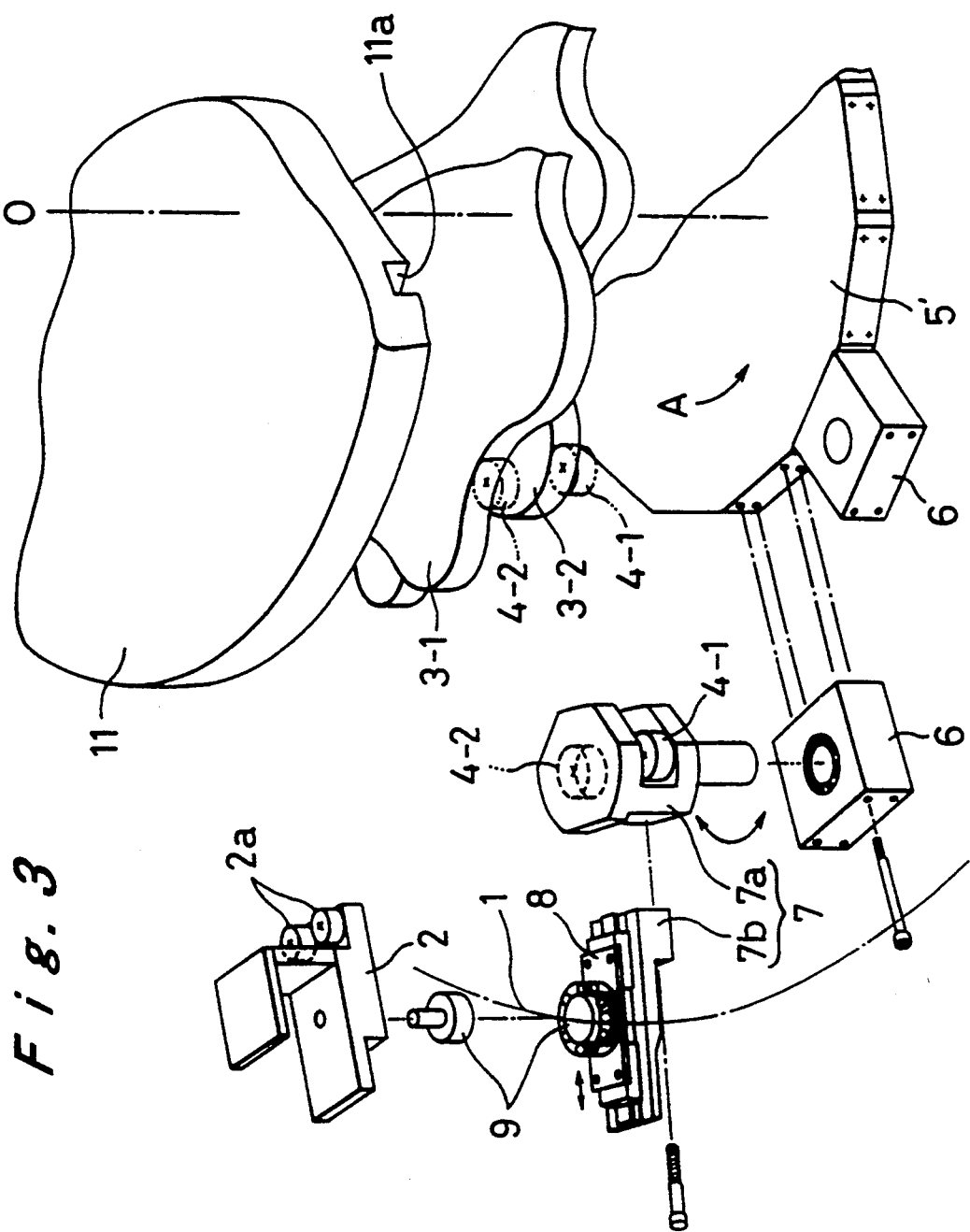
FIG. 3 is an exploded perspective view of an example in which the feeding and indexing apparatus shown in FIG. 2 is employed.

FIG. 3 shows an example in which the feeding and indexing apparatus shown in FIG. 2 is employed. In FIG. 3, each of the article feed units 2 has a pair of guide rollers 2a rollingly engaging in a circular groove 11a formed in one surface of a guide plate 11 and having the center O. Therefore, the article guide units 2 are movable along the circular path 1 defined by the circular groove 11a. The two conjugate cams 3-1, 3-2 are fixed concentrically to the guide plate 11 radially inwardly of the circular path 1, i.e., the circular groove 11a. Each pair of cam followers 4-1, 4-2, which are movable in contact with the respective conjugate cams 3-1, 3-2, is associated with one of the article feed units 2.

The feeding and indexing apparatus also has a unitary drive plate 5' with the rotary bearings 6 mounted on its outer circumferential edge. The driven arms 7 are rotatably supported by the respective rotary bearings 6. Each of the driven arms 7 has a base 7a rotatably fitted in one of the rotary bearings 6 and a radial extension 7b fastened to the base 7a by a bolt. The base 7a and the radial extension 7b make up a T-shaped driven arm. The cam followers 4-1, 4-2 are fixed to the base 7a of the driven arm 7, which is angularly movable with respect to the rotary bearing 6 as it follows the cam profiles of the cams 3-1, 3-2. The driven arm 7 and the corresponding article feed unit 2 are operatively coupled to each other by the linear sliding bearing 8.

The rotary bearing 9 is interposed between the linear sliding bearing 8 and the article feed unit 2, so that the article feed unit 2 is rotatable with respect to the linear sliding bearing 8.

The feeding and indexing apparatus shown in FIG. 3 operates in the same manner as the feeding and indexing apparatus shown in FIGS. 1 and 2.

Figure 4:
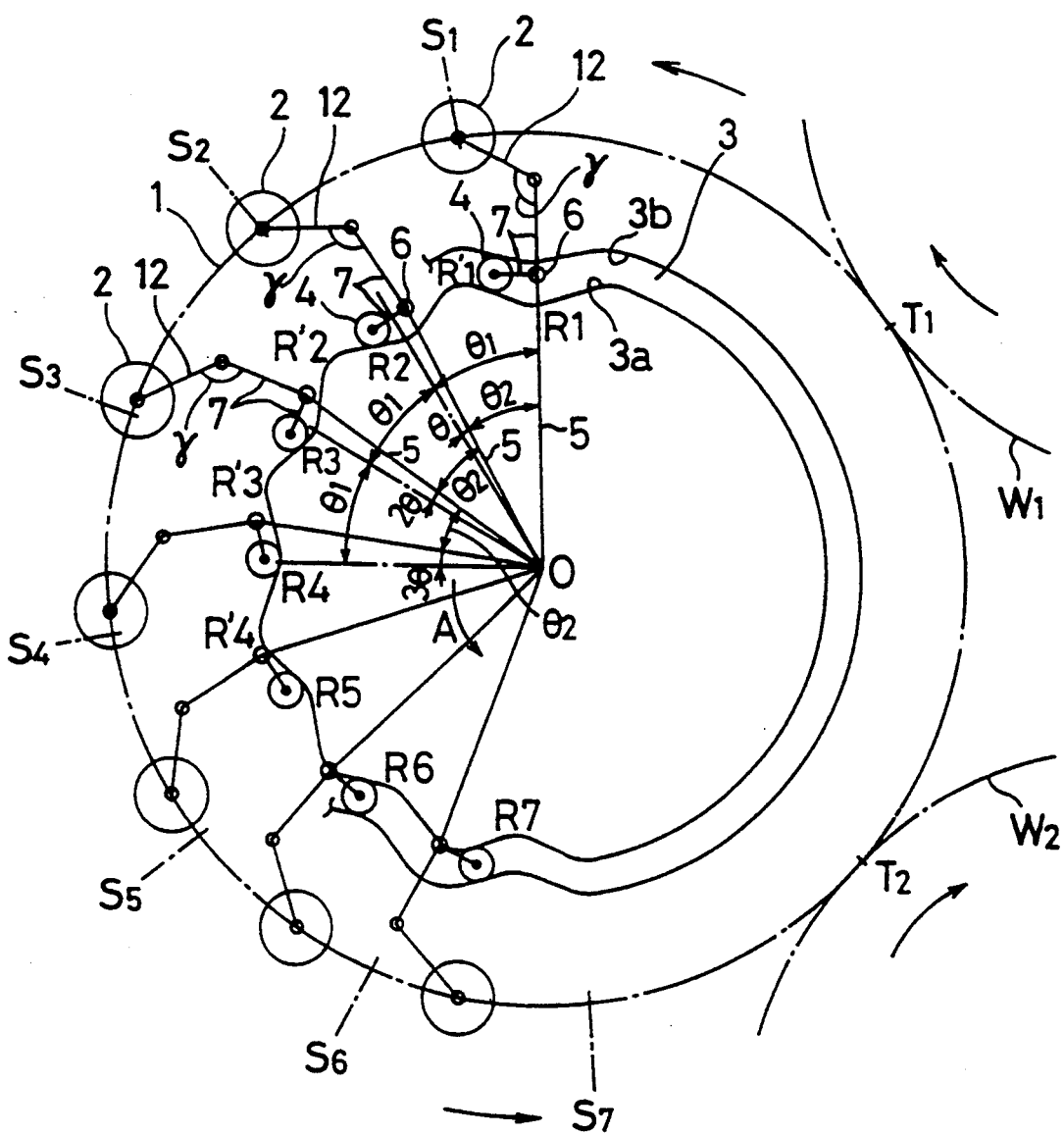
FIG. 4 is a schematic plan view of another modified feeding and indexing apparatus according to the present invention.

FIG. 4 illustrates another modified feeding and indexing apparatus according to the present invention.

The feeding and indexing apparatus shown in FIG. 4 is similar to the feeding and indexing apparatus shown in FIG. 1 except that each of the article feed units 2 is operatively connected to one of the driven arms 7 by a link 12 rather than a linear sliding bearing. The distance between the rotating axis of the driven arm 7 (the position of the rotary bearing 6) and the article feed unit 2 can vary with an angle $\gamma$ formed between the link 12 and the driven arm 7. Stated otherwise, the variations in the distance between the rotary bearing 6 and the article feed unit 2, which are present among the various stop positions $S_{1-n}$, are compensated by the variable angle $\gamma$. The other details and operation of the feeding and indexing apparatus shown in FIG. 4 are the same as the feeding and indexing apparatus shown in FIG. 1.

Figure 5:
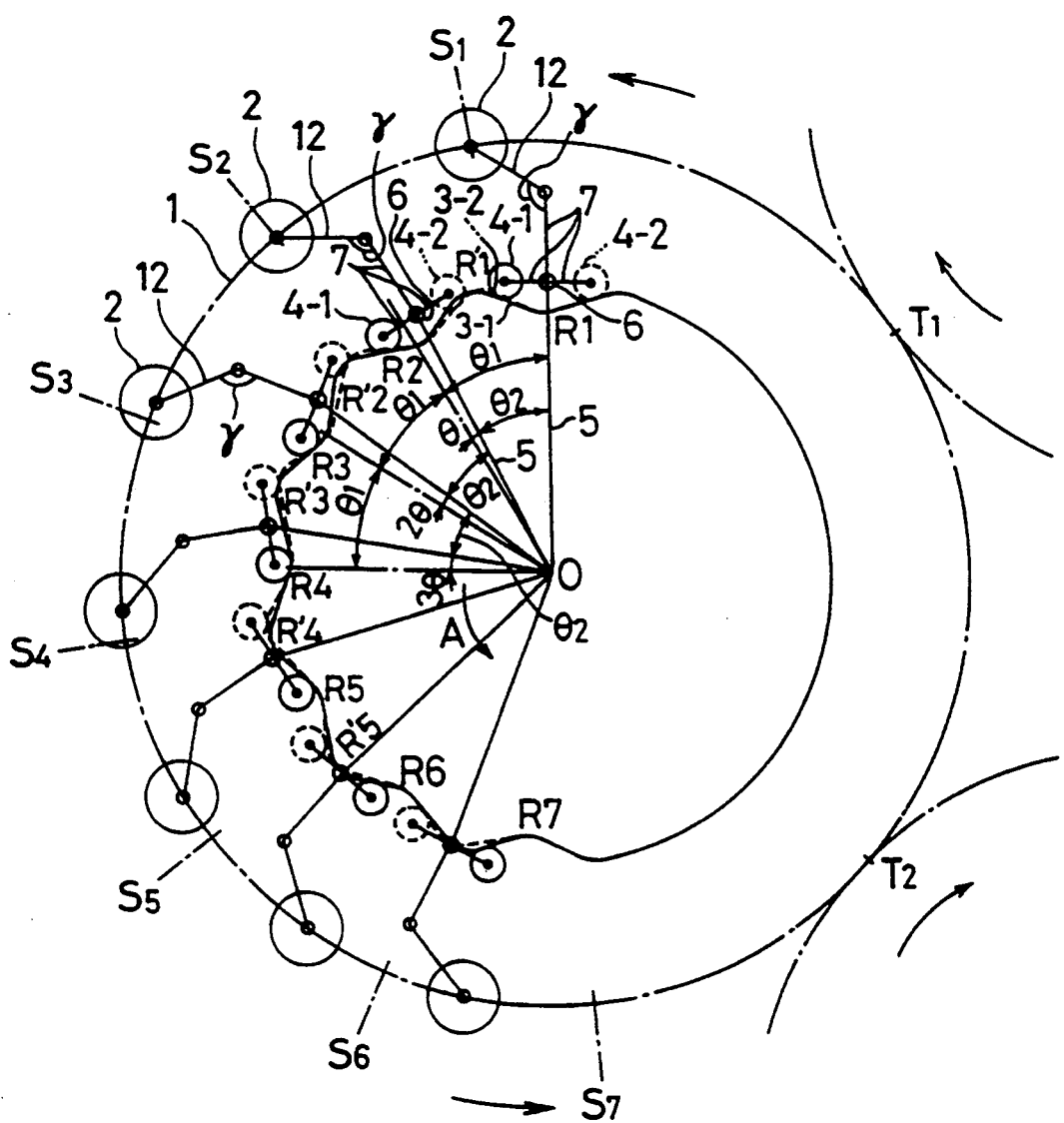
FIG. 5 is a schematic plan view of still another modified feeding and indexing apparatus according to the present invention.

FIG. 5 illustrates still another modified feeding and indexing apparatus according to the present invention.

The feeding and indexing apparatus shown in FIG. 5 is similar to the feeding and indexing apparatus shown in FIG. 2 except that each of the article feed units 2 is operatively connected to one of the driven arms 7 by a link 12 rather than a linear sliding bearing. As with the feeding and indexing apparatus shown in FIG. 4, the distance between the rotating axis of the driven arm 7 (the position of the rotary bearing 6) and the article feed unit 2 can vary with an angle $\gamma$ formed between the link 12 and the driven arm 7. Stated otherwise, the variations in the distance between the rotary bearing 6 and the article feed unit 2, which are present among the various stop positions $S_{1-n}$, are compensated by the variable angle $\gamma$. The other details and operation of the feeding and indexing apparatus shown in FIG. 5 are the same as the feeding and indexing apparatus shown in FIG. 2.

Figure 6:
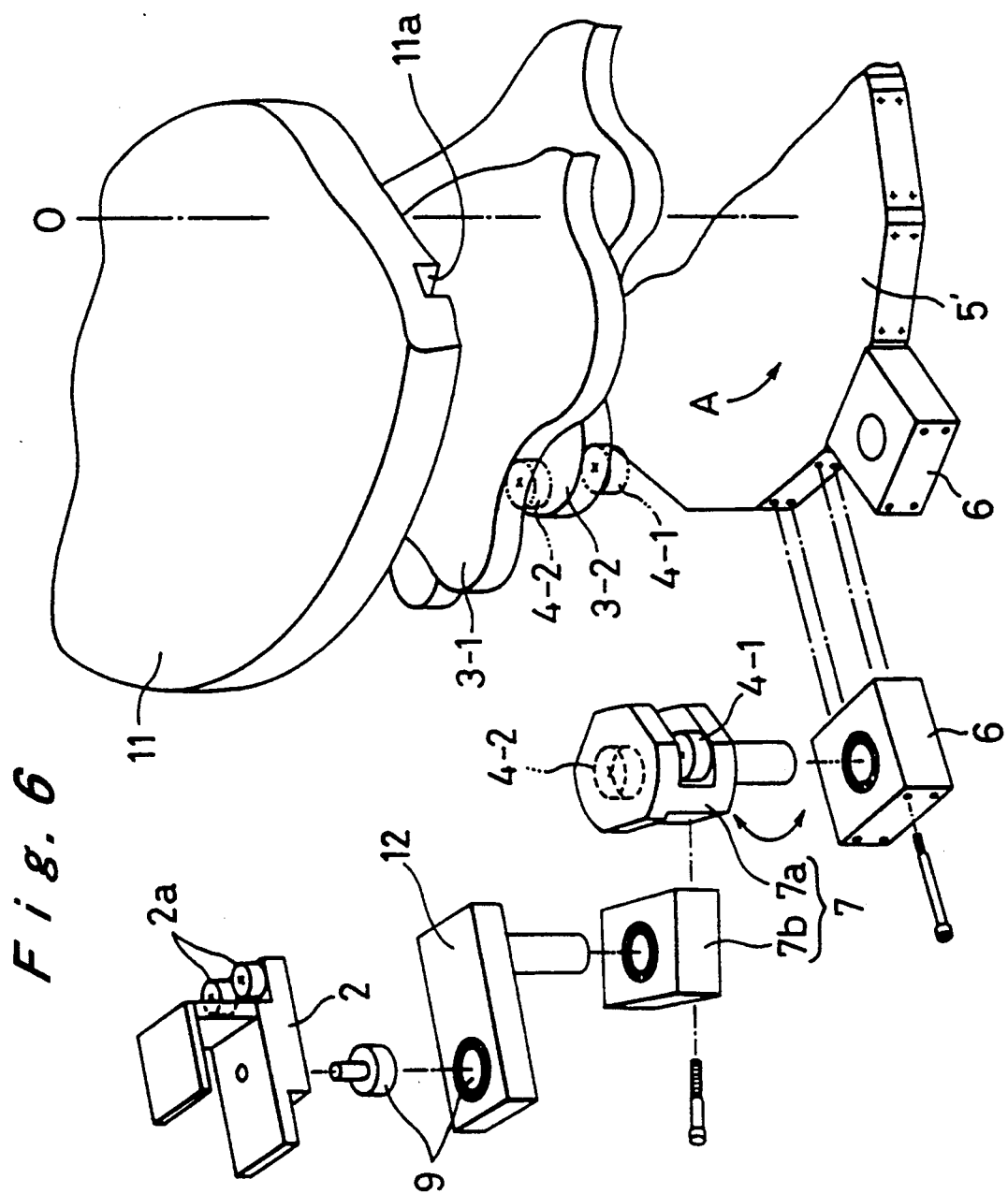
FIG. 6 is an exploded perspective view of an example in which the feeding and indexing apparatus shown in FIG. 5 is employed.

FIG. 6 shows an example in which the feeding and indexing apparatus shown in FIG. 5 is incorporated. The feeding and indexing apparatus shown in FIG. 6 has article feed units 2, conjugate cams 3-1, 3-2, cam followers 4-1, 4-2, a drive plate 5', and a guide plate 11 which are identical to those shown in FIG. 3 and will not be described in detail below.

In FIG. 6, the rotary bearings 6 are mounted on the outer circumferential edge of the drive plate 5', and each of the driven arms 7 is rotatably supported on one of the rotary bearings 6. Each of the driven arms 7 has a base 7a rotatably fitted in one of the rotary bearings 6 and a radial extension 7b fastened to the base 7a by a bolt. The base 7a and the radial extension 7b make up a T-shaped driven arm. The cam followers 4-1, 4-2 are fixed to the base 7a of the driven arm 7, which is angularly movable with respect to the rotary bearing 6 as it follows the cam profiles of the cams 3-1, 3-2. The driven arm 7 and the corresponding article feed unit 2 are operatively coupled to each other by a link 12. The rotary bearing 9 is interposed between the link 12 and the article feed unit 2, so that the article feed unit 2 is rotatable with respect to the link 12.

With the arrangement of the present invention, as described above, the pitch angle $\theta_1$ between adjacent mountains or valleys of the cam 3 differ from the pitch angle $\theta_2$ between adjacent rotary bearings 6 by which drive and driven arms 5, 7 are operatively coupled to each other. Therefore, the various article feed units 2 operate at slightly different times. Since some article feed units 2 may be stopped, while others are accelerated, or decelerated, at any given time, the load on the feeding and indexing apparatus is evened over a period of time. Consequently, the feeding and indexing apparatus is prevented from experiencing unwanted vibrations which would otherwise be caused by varying loads. The feeding and indexing apparatus allows the articles carried by the article feed units 2 to be processed smoothly, can be operated at high speed, and is highly durable.

If the feeding and indexing apparatus is used in inspecting articles carried by the article feed units 2 at the respective stop positions $S_1$-$S_7$, then the inspecting process is not adversely affected by the vibration of the feeding and indexing apparatus.

Although certain preferred embodiments of the present invention have been shown and described in detail, it should be understood that various changes and modifications may be made therein without departing from the scope of the appended claims.

What is claimed is:

1. A feeding and indexing apparatus comprising:
    a plurality of article feed units spaced along and movable in a circular path for carrying articles, respectively;
    cam means disposed radially inwardly of and concentrically with said circular path, said cam means having a wavy cam profile including a plurality of mountains and a plurality of valleys alternating with said mountains;
    a plurality of cam followers movable in contact with said cam means;
    drive arm means rotatable about a center of said cam means for moving said article feed units;
    a plurality of driven arms operatively coupled to said drive arm means and to said cam followers at respective junction points; and
    a plurality of connecting members operatively coupled to said driven arms, and to corresponding article feed units, each of said connecting members being provided for allowing the respective distance between a rotating axis of said driven arm and a corresponding article feed unit to vary;
    wherein said article feed units can start and atop along said circular path at specific intervals when said drive arm means is rotated at a constant speed; and
    wherein a pitch angle defined between adjacent ones of said mountains or valleys is different from a pitch angle defined between adjacent ones of said junction points of said drive arm means and said driven arms.

2. The feeding and indexing apparatus according to claim 1, wherein said cam means comprises a single cam groove, each of said driven arms supports one of said cam followers movable in contact with said single cam groove.

3. The feeding and indexing apparatus according to claim 1, wherein said cam means comprises a pair of cams stacked one above the other, each of said driven arms supporting two of said cam followers movable in contact with said pair of cams.

4. The feeding and indexing apparatus according to claim 1, wherein said drive arm means comprises a plurality of drive arms provided so as to correspond to said article feed units.

5. The feeding and indexing apparatus according to claim 1, wherein said drive arm means comprises a unitary drive plate.

6. The feeding and indexing apparatus according to claim 1, wherein said connecting member comprises a linear sliding bearing.

7. The feeding and indexing apparatus according to claim 1, wherein said connecting member comprises a link.

* * * * *

UNITED STATES PATENT AND TRADEMARK OFFICE
CERTIFICATE OF CORRECTION

PATENT NO. : 5,353,909
DATED : OCTOBER 11, 1994
INVENTOR(S) : Takahiro MUKAI et al.

It is certified that error appears in the above-indentified patent and that said Letters Patent is hereby corrected as shown below:

Column 8:

In Claim 1, line 5, change "atop" to --stop--.

Signed and Sealed this

Ninth Day of May, 1995

Attest:

BRUCE LEHMAN

Attesting Officer     Commissioner of Patents and Trademarks